INVENTOR.
CHARLES WOJAHN

United States Patent Office 3,334,664
Patented Aug. 8, 1967

3,334,664
MACHINE FOR ASSEMBLING SPRING
UNITS FOR MATTRESSES
Charles Wojahn, Lugers Road, Holland, Mich. 49423
Filed Nov. 5, 1964, Ser. No. 409,328
19 Claims. (Cl. 140—92.7)

This invention relates to the construction of machines used in the assembly of spring units which include groups of coil springs arranged side-by-side, with the ends in coplanar relationship. Boundary wires usually define the edges of the assembly; and in one conventional form of the units, the ends of the coil springs are interlocked with helical open-wound wires engaged laterally by rotation through an action similar to the engagement of screw threads. The preferred form of this invention is adapted to handle this type of assembly. A drive mechanism on the machine induces rotation of the helical wire, which advances as it engages the sequence of spring wires in the space between the coils of the helix.

In the course of the assembly operation, the workman proceeds to place a row of coil springs in a clamping mechanism of a machine having the primary function of accurate placement of the spring ends in position to receive the lateral engagement of the connecting coil. The coils are interposed between each row of springs at top and bottom, and the placement of an upper and lower locking coil is followed by a shifting of the machine to bring the opposite side of the spring ends into the clamping mechanism for the succeeding operation. This procedure is repeated until all of the rows of springs are installed, and the boundary wires are engaged in a similar manner.

The several features of the invention will be analyzed in detail through a discussion of the particular embodiments illustrated in the accompanying drawings. In the drawings.

Summary of function

Figure 27:
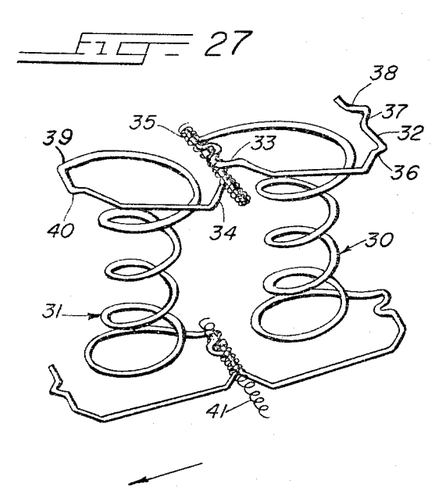
FIGURE 27 is a perspective view showing the arrangement of coil springs in side-by-side relationship, and interconnected with the open-wound helical locking coils.

The overall function of the machine described herein is to interconnect a group of coil springs in the manner shown in FIGURE 27. The springs 30 and 31 are closely similar in configuration, if not identical, and the front 32 of the top of the spring 30 is interconnected with the spring ahead of it in the same manner that the rear 33 is interengaged with the front 34 of the top of the spring 31. The interengagement is secured by the open-wound locking coil 35 which is rotated into position from the side by the machine in an action similar to the engagement of screw threads. The discontinuities 36–40 are precisely spaced in relationship to the helix angle of the coil 35 so that these portions of the springs will be interengaged as the locking coil advances laterally. The same construction is provided at the bottom of the coils 30 and 31, these being engaged by the locking coil 41. The coils 30 and 31 each represent a lateral row of coil springs that are assembled in the machine in a group. The necessity of accurate placement of the coils with respect to each other preparatory to receiving the locking coils is responsible for the clamping structure of the machine. After the locking coils 35 and 41 have been moved into position, the machine shifts the entire assembly in the direction of the arrow in FIGURE 27 to bring the right-hand portions of the coils 30 into engagement with the clamping devices, and permitting the workman to install another row of springs. At each step, the clamping devices receive the adjacent portions of the top and bottom of the coil springs 30 and 31, and hold these securely in position for the passage of the locking coils as they interengage with these components.

Clamping devices

The construction of the individual clamping devices for gripping the adjacent portions of the coil springs 30 and 31 is best shown in FIGURES 8 and 23–26. The construction of the clamping devices at the top of the springs is essentially the same as that at the bottom. A fixed jaw member 42 is secured to a mounting plate 43 extending along the beams 44 and 45. The plate 43 may be secured to the beam in any convenient fashion, but it is preferable to secure the members 42 to the plate 43 with either removable fastenings or a clamping arrangement. A series of holes in the plate 43 at predetermined positions will permit the lateral shifting of the clamping devices to conform to particular spring units being manufactured. The members 42 may be secured in the selected position by conventional screws as shown at 46 in FIGURE 8.

Figure 8:
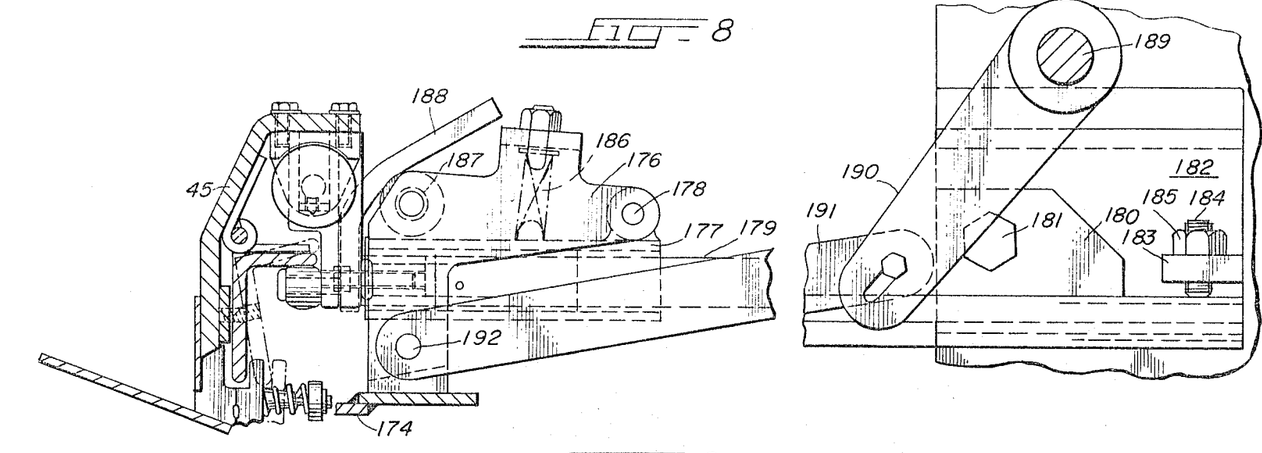
FIGURE 8 is a view similar to FIGURE 7, taken at a plane 8—8 of FIGURE 1 to show the clamping and hold-down mechanism.
Figure 9:
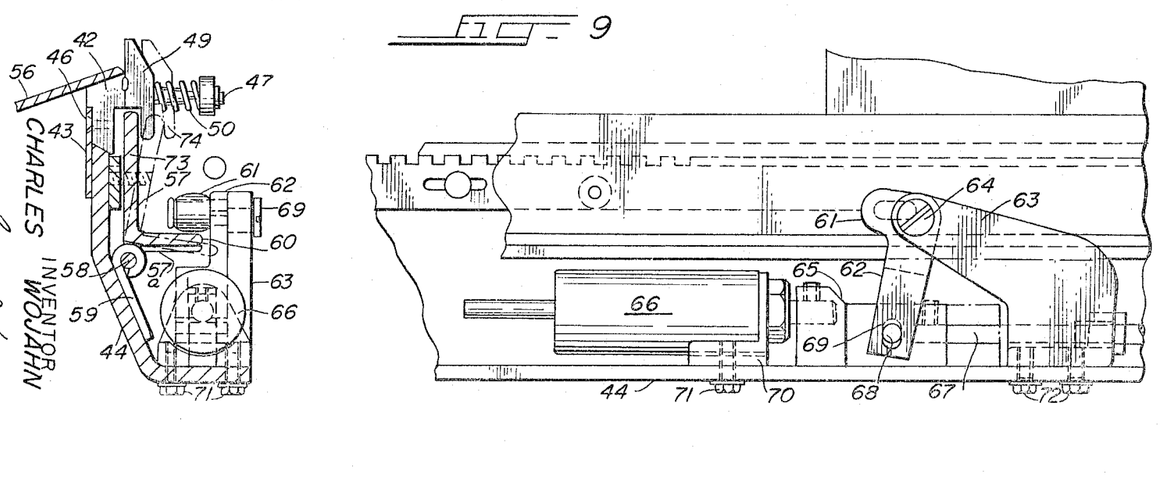
FIGURE 9 is a rear elevation of the lower portion of the mechanism shown in FIGURE 8.

The members 42 are provided with a pair of posts shown at 47 and 48, and these function as guideways for the movable jaw members 49. Springs 50 and 51 surround these posts, and are retained by the caps 52 and 53 secured by the clips 54 and 55, respectively. The function of the compression springs 50 and 51 is to urge the movable jaw members 49 toward the fixed jaw members 42, so that the spring ends are securely grasped by this resilient action. The fixed members 42 are each provided with inclined plates 56 which function as ramps permitting the worker to shove the springs in from the left, as shown in FIGURE 8, so that the sides of the springs will be guided into the spaces between the movable jaws 49 and the fixed jaws 42. After the engagement of the locking coils 35 and 41 is completed, the machine will shift the entire assembly to the right, as shown in FIGURE 8, pulling the opposite edges of the springs along the ramps 56 so that the following edges will snap into the open clamping jaws.

The mechanism for opening the movable jaws 19 against the action of the springs 50 and 51 centers in the angular torsion bar 57. This bar is mounted on the leaf 57a of a hinge rotating about the axis of the rod 58, the opposite leaf 59 being secured to the beam 44. The flange 60 of the bar 57 is engaged by the roller 61 mounted on the arm 62 pivotally connected to the bracket 63 at the pin 64. This mechanism is preferably repeated at another position on the beam 44 to reduce deflection. A sliding block 65 is positioned by the air cylinder 66 mounted on the beam 44, and the push rod 67 communicates the movement of this block to corresponding blocks at other positions. The cross pin 68 mounted in the block 65 moves within the opening 69 of the arm 62, and the result of this arrangement is to rotate the torsion bar 57 about the axis of the hinge rod 58 in response to the action of the air cylinder 66. This air cylinder is conventional in design, and may be mounted on a conventional bracket 70 secured to the beam 44 by bolts 71. This same type of mounting is preferred for the bracket 63, which may be secured by the bolts 72.

The movement of the upper flange 73 of the torsion bar 57 is communicated to the movable jaw member 49 all the tab 74. Clockwise rotation of the torsion bar 57, to the dotted line position shown in FIGURE 8, will produce a movement to the right of the jaw member 49 to the "open" position. The jaw members 49 are cut away as shown at 75 and 76 to receive the discontinuities 37 and 38 of the coil springs, and the plate 56 is cut away as shown at 77 for clearance purposes. The mounting screw 78 securing the plate 56 to the fixed jaw member 42 is positioned so that it will not interfere with the clearance contour of the plate.

Figure 25:
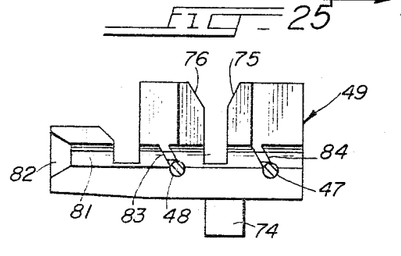
FIGURE 25 is a section on the plane 25—25 of FIGURE 23.
Figure 26:
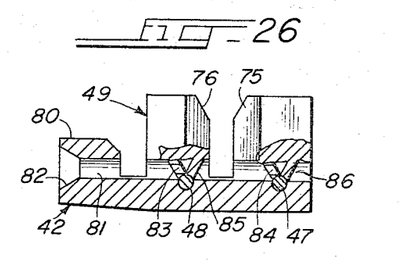
FIGURE 26 is a section on the plane 26—26 of FIGURE 23.

The jaw members 42 and 49 each have a lateral extension as shown at 79 and 80, respectively. A general cylindrical passage 81 is formed by opposite semi-cylindrical recesses in each of these jaw members which define the passage when the jaw members are placed together. The entrance 82 to this passage is flared to facilitate the entrance of the locking coils. The spacing of the pins 47 and 48 is such as to register with the spacing of the lock-coil, and the jaw members 42 and 49 are also preferably cast with fragments of helical ridges as shown at 83 and 84 (on the jaw member 49), and 85 and 86 (on the jaw member 42). The slant of these ridges within the bore 81 is such as to register with the locking coils, and facilitate the movement of the coil as it is rotated by the driving mechanism of the machine. FIGURE 25 is taken on the center line of the bore 81, and FIGURE 26 is taken at a position set back somewhat into the jaw member 42 so that the result is to look through a portion of the jaw member 42 which includes the ridges 85 and 86. The ridges 83 and 84 on the jaw member 49 are visible on the other side of the bore 81.

*Mechanism for positioning the clamping beams*

Figure 7:
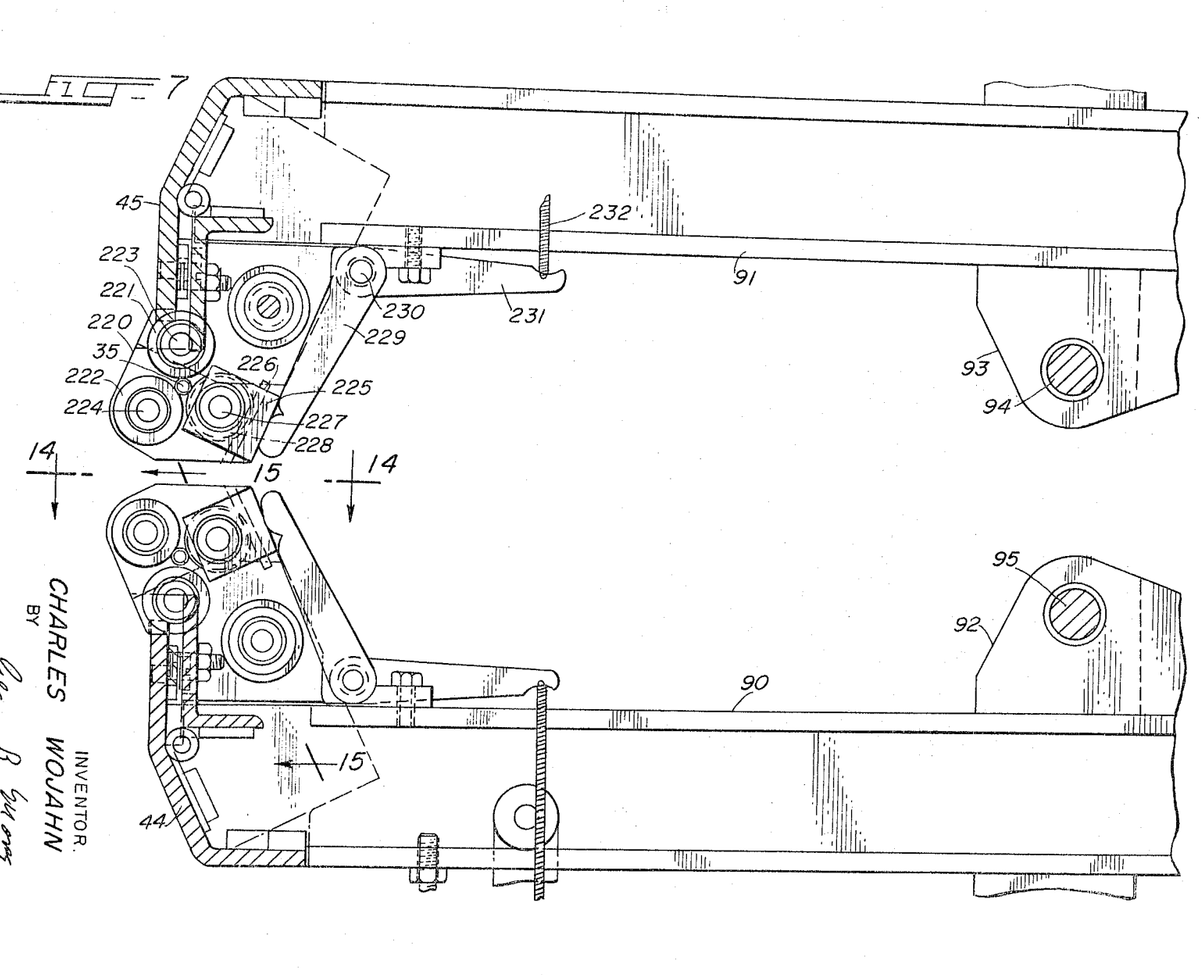
FIGURE 7 is a section on an enlarged scale on the plane 7—7 of FIGURE 1, showing the arrangement of the ends of the clamping beams.

Referring to FIGURE 7, the clamping beams 44 and 45 and their associated mechanism are supported at each end on cantilever arms as shown respectively at 90 and 91. These are provided with brackets 92 and 93 engaging the shafts 94 and 95 mounted on the frame 96 of the machine. This frame includes similar structure at the opposite sides of the machine, the fixed portion of the frame being represented by the vertical columns 97 and 98, the front leg 99, the horizontal floor member 100, the horizontal member 101 interconnecting the top of the leg 99 with the column 97, and the shelf support 102. These members are all preferably formed of so-called "angle iron" having a cross section in the form of a 90-degree angle.

The frame 96 also includes (on both sides of the machine) a movable plate 103 slidably received between the columns 97 and 98. This plate is maintained in assembled relationship with respect to the columns 97 and 98 by the presence of the plates 104 and 105 secured on one side of the plate 103, and the members 106 and 107 secured to the opposite side of the plate 103 (refer to FIGURES 2 and 18). These members overlap the adjacent portions of the columns 97 and 98 so that a guideway for the movement of the plate 103 results. The plate 103 is therefore in coplanar relationship with the flanges 108 and 109 of the columns 97 and 98, respectively. Several members having other functions have the additional effect of confining the plate 103, as will be apparent from the discussion of the remainder of the machine.

Figures 18, 19, 20, 21, 22:
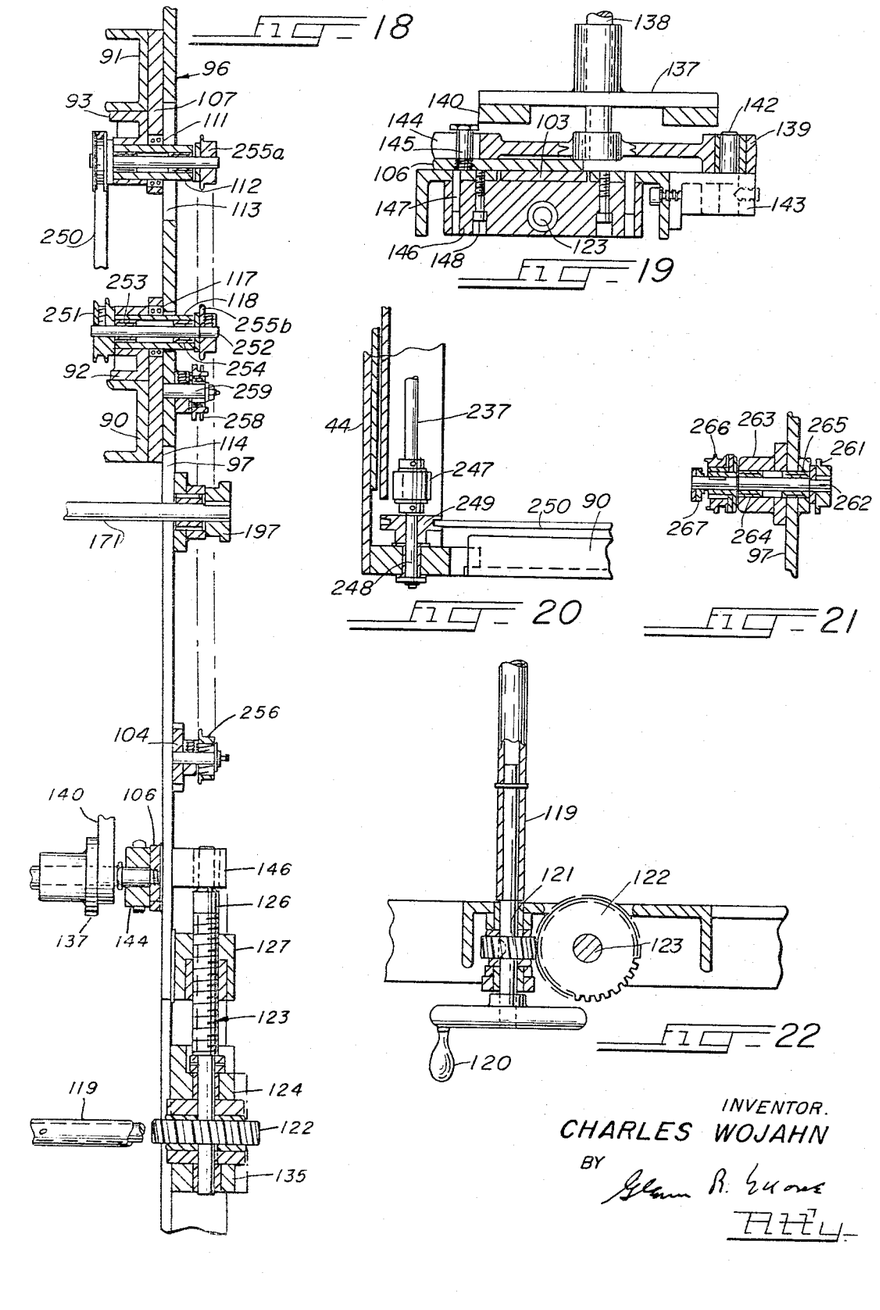
FIGURE 18 is a sectional front elevation on the plane 18—18 of FIGURE 2.
FIGURE 19 is a fragmentary section on the plane 19—19 of FIGURE 2.
FIGURE 20 is a fragmentary section on the plane 20—20 of FIGURE 2.
FIGURE 21 is a section on the plane 21—21 of FIGURE 2.
FIGURE 22 is a section on the plane 22—22 of FIGURE 2.
Figure 23:
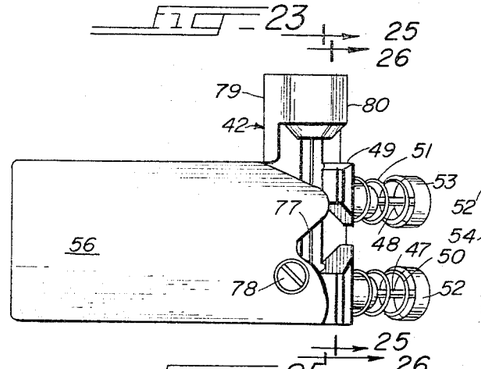
FIGURE 23 is a top view on an enlarged scale, showing one of the clamping devices.
Figure 24:
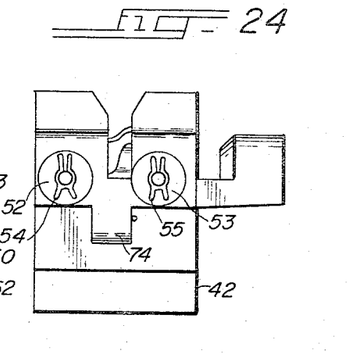
FIGURE 24 is a rear elevation of the clamping device shown in FIGURE 22.

The member 107 is preferably secured to the plate 103 by screws as shown at 110, and is preferably provided with a bearing shown at 111 in FIGURE 18 for receiving the tubular shaft 112. This shaft has a tight fit in the bracket 93, and the resulting arrangement provides for a pivotal mounting of the arm 91 on an axis which is fixed with respect to the plate 103. A slot 113 is provided in the flange 108 of the column 97 to accommodate the vertical movement of the shaft 112.

Vertical adjustment of the plate 103 will have the effect of increasing the gap between the arms 90 and 91, the arm 90 being mounted on a fixed pivotal axis as a result of the securing of the plate 114 to the flanges 108 and 109 by screws as shown at 116. The bearing 117 is mounted in the plate 114, and receives the tubular shaft 118. This shaft is tightly received in the bracket 92, with the result that the arm 90 is pivotally mounted on an axis which is fixed with respect to the columns 97 and 98.

Adjustment of the vertical position of the pivot axis of the arm 91 with respect to that of the arm 90 is accomplished by rotation of the shaft 119 with the crank wheel 120. This rotation drives the worm gear 121 in its engagement with the pinion 122, and correspondingly induces rotation of the vertical shaft 123. This shaft is rotatably supported between the short bridging members 124 and 125 secured to the flanges 108 and 109. The shaft 123 has a threaded portion 126 engaging the block 127 secured to the plate 103. The effect of rotation of the crank 120, and the resulting rotation of the shaft 123, is to move the block 127 vertically to carry the plate 103 and the mounting of the arm 91 with it. The mechanism associated with the shaft 123 serves the general purpose of a screw jack.

Figure 10:
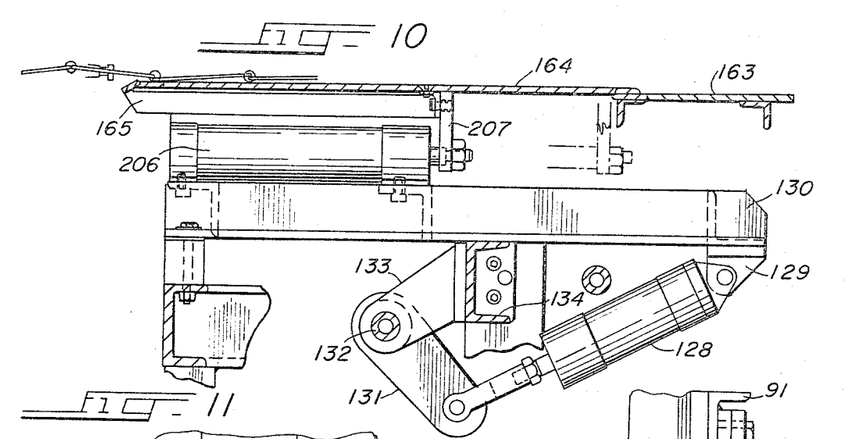
FIGURE 10 is a sectional elevation showing the actuation of the shaft that controls the working position of the clamping bars.

The purpose of the pivotal mounting of the arms 90 and 91 is to provide a gripping and release arrangement for controlling the position of the rows of springs as they are being assembled. The release, or opening movement, involves an opposite rotation of the arms 90 and 91 about their respective pivot axes to the point that the clamping devices carried by the beams 44 and 45 are retracted to a position where they do not interfere with the movement of the spring unit being assembled as the machine shifts from one row to the next. This angular movement of the arms 90 and 91 is generated by the action of the air cylinder 128 shown in FIGURE 10. This cylinder is suspended between the bracket 129 mounted on the frame member 130, and the radius arm 131 carried by the shaft 132. This shaft is supported by the bracket 133 mounted on the horizontal beam 134 of the frame, and by bearings in the frame members 101. Rotation of the shaft 132 by the cylinder 128 results in rotation of the arms 135 (see FIGURE 2), and correspondingly movement of the links 136 pivotally connected both to the arms 135 and the arms 90.

Figure 11:
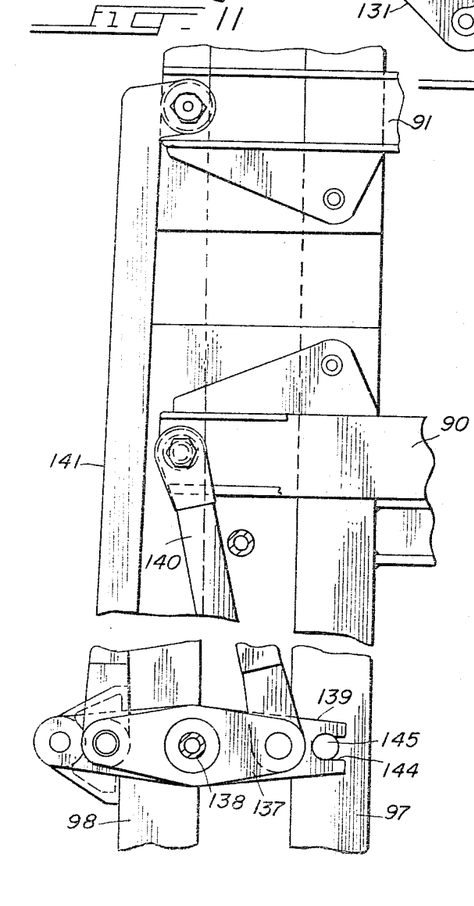
FIGURE 11 is a fragmentary elevation of the inside of one end of the frame, showing the linkage for relating the working positions of the clamping bars.
Figure 12:
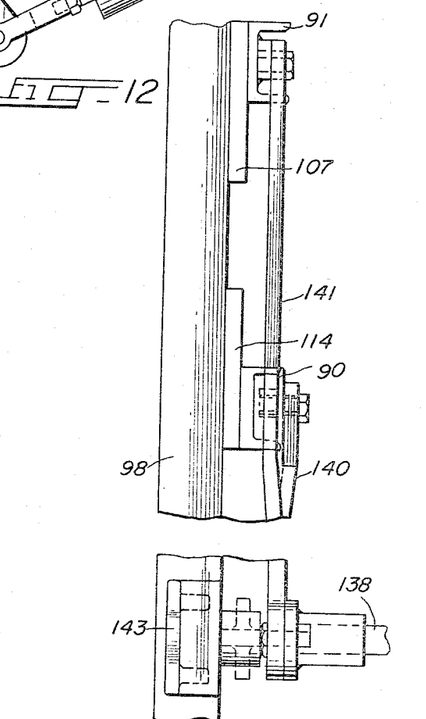
FIGURE 12 is a rear elevation of the mechanism shown in FIGURE 10.

The angular movement of the arm 90 about its pivot axis is related to that of the arm 91 by the mechanism best shown in FIGURES 11 and 19. The arm 137 is mounted on the shaft 138, which is rotatably received within a bearing insert in the lever 139. A link 140 connects one side of the arm 137 to the lower beam-supporting arm 90, and the link 141 connects the opposite end of the arm 137 to the upper beam-supporting arm 91. Movement of the lower beam will therefore induce rotation of the arm 137, and corresponding movement of the arm 91.

This correlation of the pivotal movements of the arms supporting the upper and lower clamping beams must be maintained in the various positions of vertical adjustment of the upper clamping assembly, and this is provided by the arrangement for positioning the lever 139. One end of this lever is rotatably mounted on the pin 142 supported by the bracket 143 secured to the frame column 98. The opposite end of the lever has a slot at 144 for engaging the pin 145 carried by the member 106 which moves with the plate 103 during the vertical adjustment of the machine to accommodate spring assemblies of various sizes. This vertical adjustment will therefore produce a rotation which will tend to move the upper arm 91 in a direction to compensate for the effect of the vertical adjustment, and preserve the angular relationship between the arms 90 and 91. As the arm 91 and its associated mechanism is adjusted upwardly to increase the gap between the arms 90 and 91, the effect of such movement is to carry the pin 145 upwardly. This movement produces upward movement of the shaft 138, and corresponding rotation of the arm 137 because of the fixed position of the arm 90 controlling the link 140. The resulting rotation of the arm 137 produces upward movement of the link 141. This movement is correlated with the upward adjustment, and the proportions of these components can be selected such that the angular relationship of the arms 90 and 91 is maintained throughout the range of vertical adjustment of the pivot axis of the arm 91. It is desirable to maintain this relationship with considerable accuracy, and it is preferable to include the cross member 146 on the frame for positioning the upper extremity of the screw shaft 123 and also the portion of the plate 103 in this area. The member 146 is preferably secured in position through the use of conventional locating pins as shown at 147 and screws 148 (see FIGURE 19). With the arm 106 secured to the plate 103 as previously described, the net effect of the arrangement is to closely maintain the alignment of the plate 103 under all conditions.

*Shifting mechanism*

Figure 16:
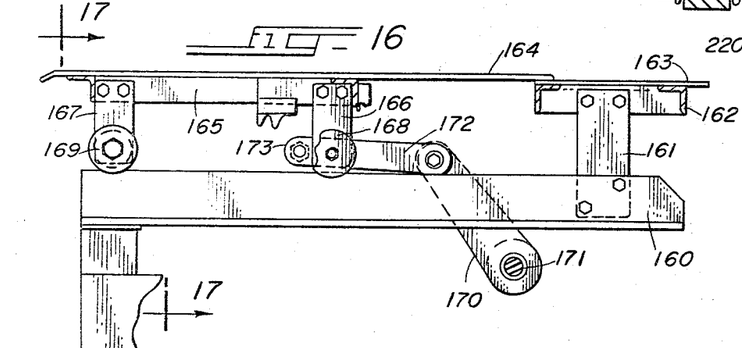
FIGURE 16 is a fragmentary sectional side elevation showing the mechanism for inducing movement of the supporting panel.
Figure 17:
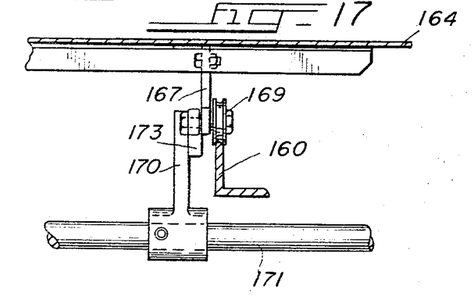
FIGURE 17 is a section taken on the plane 17—17 of FIGURE 16.

Referring particularly to FIGURES 16 and 17, the frame of the machine includes a pair of rails 160 mounted at the opposite sides of the machine in a front-rear direction. These rails are suspended at the rear from the straps 161 secured to the frame component 162. This component also supports a fixed portion 163 of a table surface which may extend to the right (as shown in FIGURE 16) to any desirable length to accommodate the particular spring assemblies being manufactured. A movable panel 164 has a reinforcing structure 165, and has legs 166 and 167 at opposite sides of the machine and adjacent the rails 160. Rollers 168 and 169 are rotatably mounted respectively on the legs 166 and 167, and support the movable table 164 on the rails 160 at a position slightly above the fixed table portion 163.

An arm 170 is carried by the shaft 171, and the link 172 communicates the movement of the arm 170 to the movable panel 164 through the pivotal connection of the link 172 at the bracket 173 mounted on the leg 166. Rotation of the shaft 171 will therefore induce movement of the panel 164 in a front-rear direction.

Figure 3:
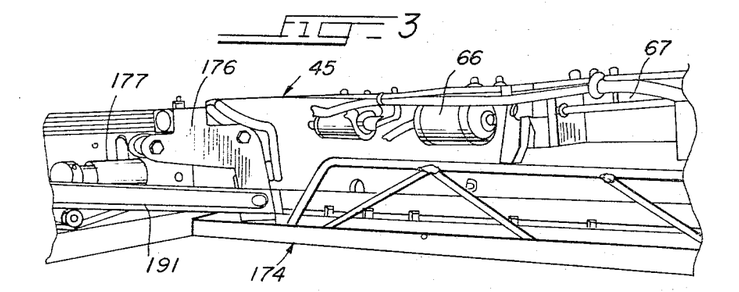
FIGURE 3 is a fragmentary perspective view on an enlarged scale of the rear of the clamping beam.
Figure 4:
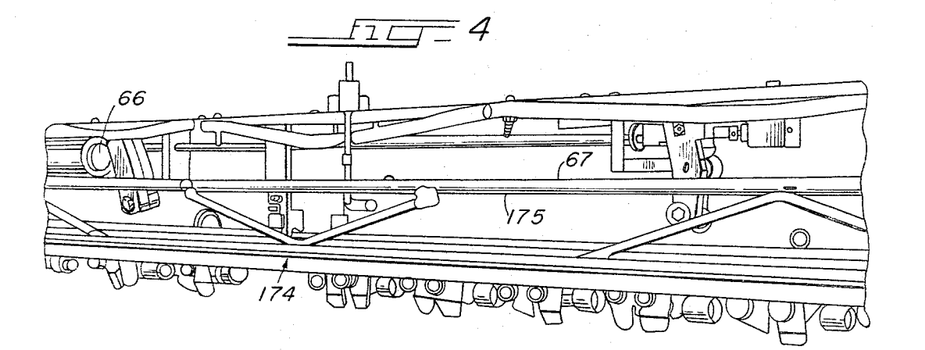
FIGURE 4 is a view similar to that of FIGURE 3, taken along a different position of the clamping beam, and showing the hold-down bar assembly in an elevated position.
Figure 5:
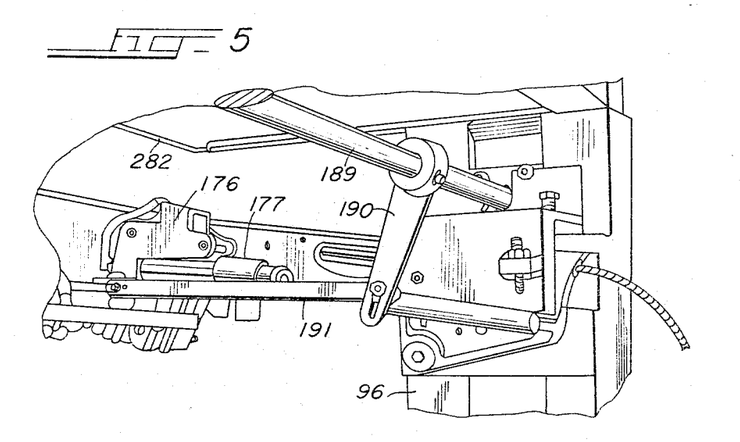
FIGURE 5 is a perspective view from the rear showing a portion of the machine associated with the mechanism for inducing movement of the hold-down bar.
Figure 6:
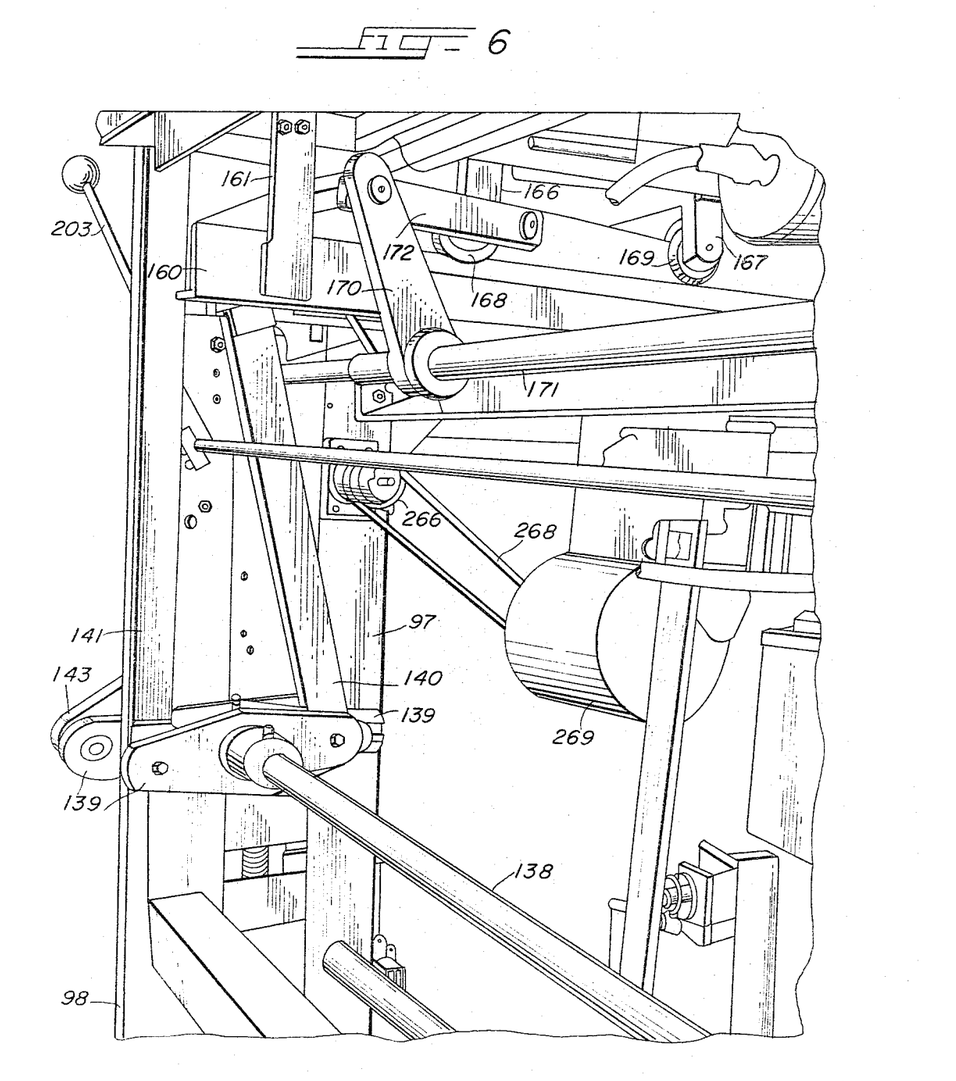
FIGURE 6 is a perspective from the rear of the machine showing the mechanism adjacent one side of the frame.

When the spring assembly is being shifted after completing a row of springs, preparatory to the assembly of the succeeding row, the unit is gripped between the supporting panel 164 and the hold-down bar 174. These two members grip the spring assembly and shift it a predetermined amount corresponding to the front-to-rear distance across the ends of the springs 30 and 31. The hold-down bar 174 is preferably provided with a stiffening structure shown at 175 in FIGURES 3 and 4, and is carried at its opposite ends on the arms 176 pivotally mounted on the carriers 177 at the pins 178 (see FIGURE 8). The carriers 177 are slidably mounted on rods 179 provided with the brackets 180 engaged by the bolts 181 secured to a frame member 182. A shelf 183 secured to the frame member 182 provides a base for the screw 184, and rotation of this screw will induce a rotation of the rod 179 about the axis of the bolt 181 for adjustment. The lock nut 185 is preferably provided to maintain the adjusted position.

The arms 176 are biased with respect to the carriers 177 by the action of the springs 186. This action tends to raise the hold-down bars 174. As the carrier 177 moves to the left, as shown in FIGURE 8, however, the rollers 187 on the arms 176 encounter the inclined plates 188 mounted on the beam 45. This action depresses the arm 176 against the action of the spring 186, and induces a firm engagement with the top of the spring unit being assembled.

The actuation of the shifting mechanism produces a rotation of the shaft 189, and a corresponding rotation of the arm 190. This is communicated to the carriers 177 by the links 191, and the pivotal connection of the links 191 to the arms 176 at the pins 192 is located with respect to the axis of the pins 178 such that a rearward pull on the links 191 tends to maintain the downward pressure on the spring units during the shifting movement. This movement is accompanied by counterclockwise rotation of the shaft 189 (as shown in FIGURE 8), and opposite rotation after the shifting motion has been completed will induce a counterclockwise rotation of the arms 176 about the pins 178 to raise the hold-down bar 174 so that it will move upward and over the spring unit.

The rotation of the shaft 189 is related to that of the shaft 171 to assure that the carrier 177 moves with the supporting panel 164. The shaft 189 is rotatably mounted on the member 105 which moves with the plate 103. A gear 193 is fixed to the end of the shaft 189, and meshes with an idler gear 194 rotatably mounted in the member 105. The member 105 also has a guard portion 195 which slidably receives the rack 196, and supports it for proper engagement with the idler 194. Vertical movement of the rack 196 will induce rotation of the idler pinion 194, and opposite rotation of the gear 193. The lower end of the rack 196 engages the pinion 197, which is secured to the shaft 191. The shaft 171 is mounted in the member 198, which is fixed with respect to the columns 97 and 98.

Figure 2:
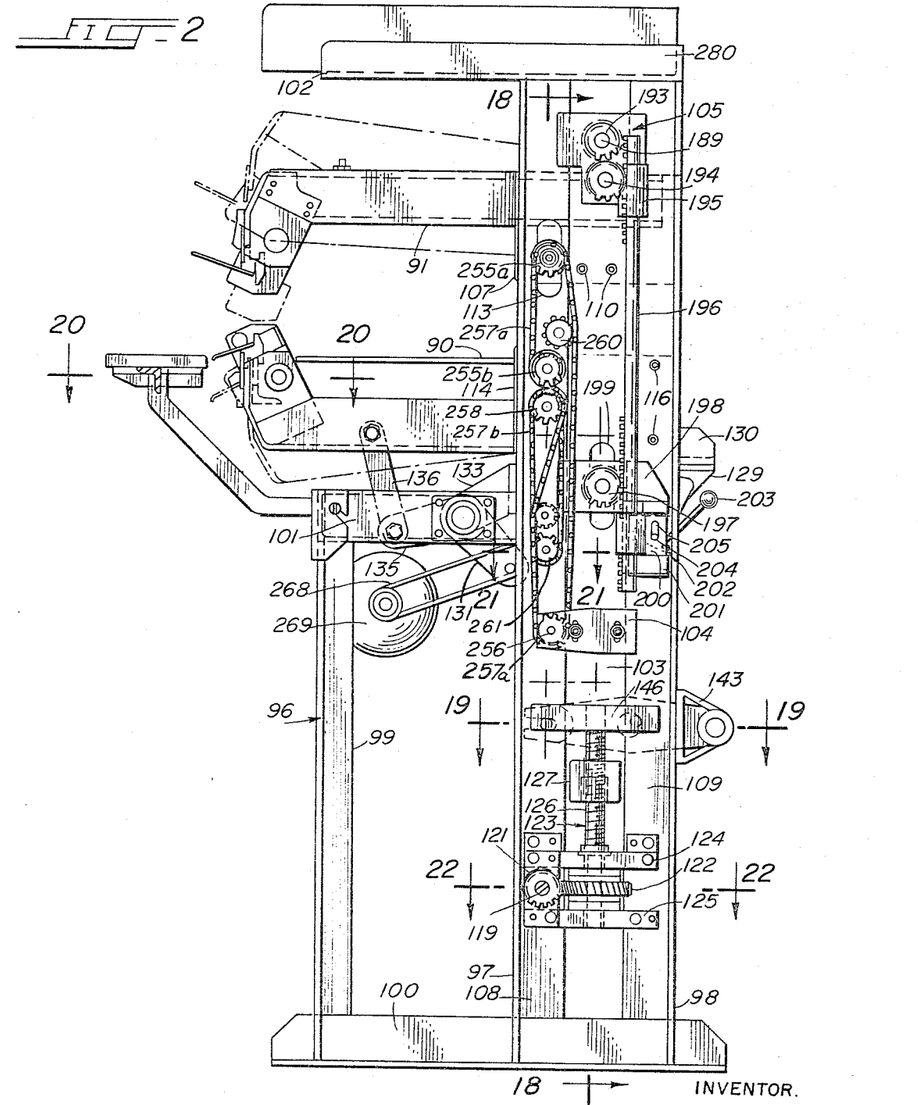
FIGURE 2 is a side elevation of the machine shown in FIGURE 1, with the cover removed to expose the mechanism located on the exterior of the frame.

The cut-out 199 in the plate 103 permits the vertical shifting of the plate without interference from the shaft 171. The guide block 200 is slidably mounted between the member 198 and the member 201 secured to the frame. The guide block 200 positions the lower portion of the rack 196, and is shiftable to the right (as shown in FIGURE 2) to disengage the rack 196 from the pinion 197 to permit vertical adjustment of the position of the upper clamping beam. Movement of the block 200 is controlled by the cam 202 pivotally mounted on the column 98, and positioned by the handle 203. The pin 204 carried by the cam 202 rides in the slot 205 of the block 200 to relate the movement of the cam and the block.

The mechanism associated with the rack 196 correlates the movement of the hold-down bar and the shiftable platform, and the actuation of these components is induced by the cylinder 206 (refer to FIGURE 10) mounted on the frame of the machine. A member 207 is secured to the structure 165 of the panel 164, and the action of the cylinder will shift the member 207 from the full line to the dotted line position of FIGURE 10.

*Mechanism for driving the locking coils into engagement with the springs*

Figure 1:
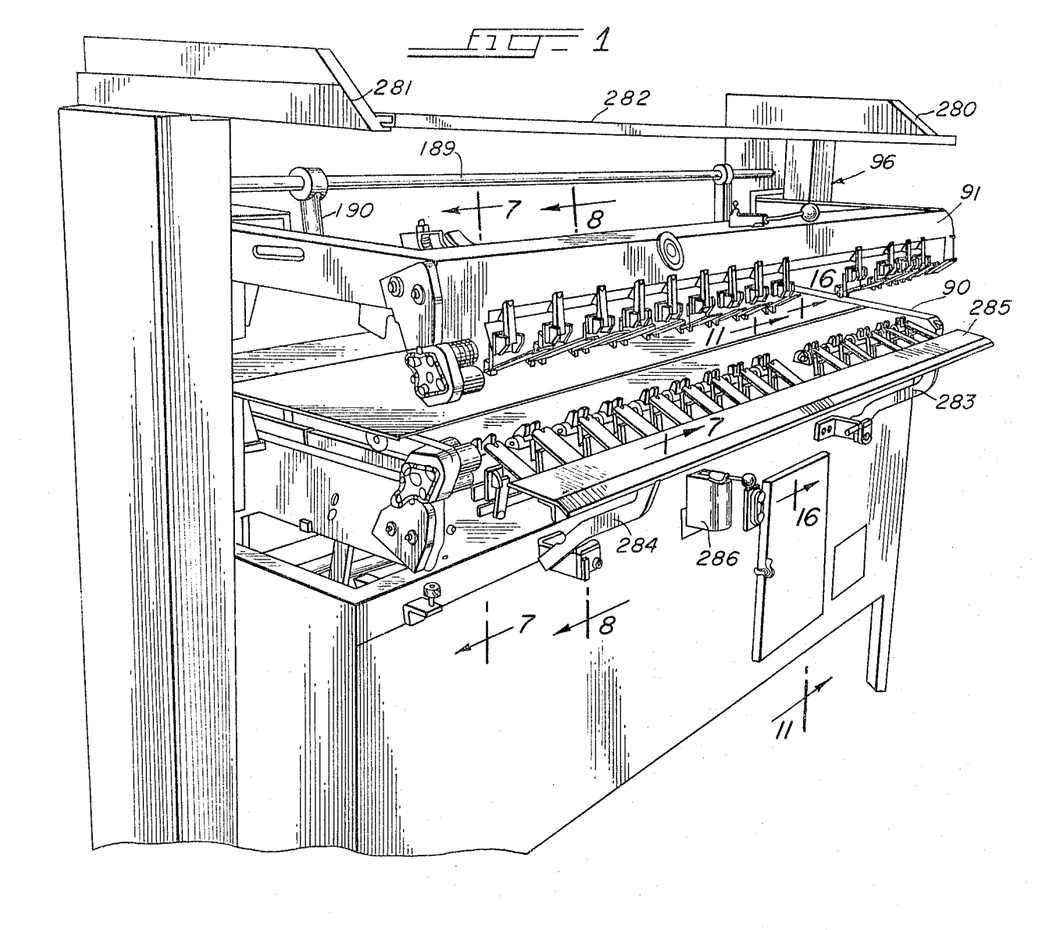
FIGURE 1 is a perspective view from the front quarter of a complete machine embodying the invention.

A mechanism is provided at the left end of both the upper and lower clamping beams, as viewed in FIGURE 1, for driving the locking coils 35 and 41 into position. Refer to FIGURES 7 and 13–15. The upper and lower units are practically identical, and only one of these will be described in detail. A heavy plate 220 is secured to the outer extremities of the beams 90 and 91, and the rollers 221 and 222 are mounted on fixed shafts 223 and 224, respectively, secured to the plate 220. A block 225 is pivotally mounted in the plate 220 on the pin 226, and this block carries a shaft 227 supporting the roller 228. The rollers 221, 222, and 228 are grouped in planetary fashion around a space sufficient to accommodate the coil 35. The pivotal mounting of the block 225 permits the roller 228 to be moved toward and away from the plane containing the axes of the rollers 221 and 222, making it possible for the roller 228 to be brought to and from bearing engagement with the locking coil 35. This movement is controlled by the arm 229 carried on the short shaft 230; and this arm, in turn, is positioned by the arm 231 controlled by the actuator 232. Preferably, a biasing spring (not shown) urges the block 225 in a direction to relieve pressure on the locking coil 35, and the operation of the actuator 232 will rotate the arm 229 in clockwise direction and drive the block 225 into tight engagement with the locking coil 35.

Figure 13:
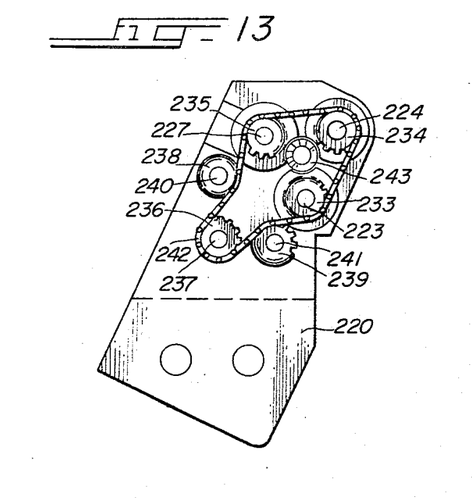
FIGURE 13 is an end elevation showing the power transfer at the end of the clamping beam for driving the coil-feeding mechanism.
Figure 14:
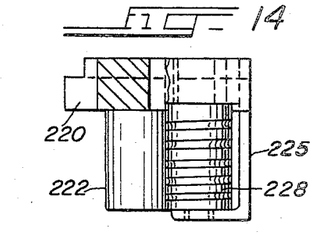
FIGURE 14 is a sectional view on the plane 14—14 of FIGURE 7 showing the driving rollers used to rotate the locking coil.
Figure 15:
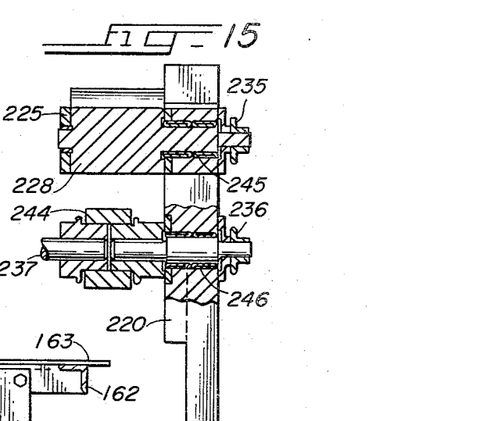
FIGURE 15 is a section on the plane 15—15 of FIGURE 7.

The rollers 221, 222, and 228 are driven by a group of sprockets mounted on the opposite side of the plate 220 from the rollers. This arrangement is best shown in FIGURE 13. The sprockets 233, 234, and 235 are respectively positioned on the shafts 223, 224, and 227. A driving sprocket 236 is mounted on the shaft 237, and the idler sprockets 238 and 239 are respectively mounted on the stub shafts 240 and 241. A chain 242 engages the sprockets in the manner shown in FIGURE 13, and a tubular guide 243 traverses the plate 220, and communicates with the space between the rollers 221, 222, and 228. A length of locking coils manually shoved into the guide 243 until it is in position to be engaged by the feed rollers, and is then rotated by power transferred through the shaft 237. If desired, the shaft 237 may be interrupted by a coupling 244. All of the shafts supporting the rollers and sprockets in the plate 220 are preferably supported in conventional needle bearing units as shown at 245 and 246 in FIGURE 15.

The shaft 237 extends across to the opposite side of the machine to the coupling 247 connecting it to the spindle 248, which may be functionally regarded as a continuation of the shaft 237 (see FIGURE 20). The coupling 247 may also be constructed as a torque-limiting device. The pulley 249 receives a belt 250 which also engages the pulley 251 mounted on the shaft 252 carried within the tubular shaft 118 (see FIGURE 18). Suitable needle bearing units as shown at 253 and 254 support the shaft 252 within the tubular shaft 118. The sprocket 255a is also secured to the shaft 252 for driving the pulley 251.

The power transmission to the sprockets 255a and 255b must accommodate the vertical adjustability controlled by the crank 120. For this purpose, the idler 256 (see FIGURES 2 and 18) is rotatably mounted on a suitable shaft on the member 104 secured to the moving plate 103 of the frame. Since the sprocket 255a moves with the plate 103, the chain 257 is also carried with the plate. The double sprocket 258 has sprocket sections in spaced planes, and is rotatably mounted on the stub shaft 259 which is fixed with respect to the frame of the machine. This sprocket may be considered as the driving sprocket for the chain 257a, and it will be noted that the sprocket 256 and 255a may move vertically without disturbing the tension of the chain 257. The sprocket 255b remains on a fixed axis. An idler sprocket 260 is preferably incorporated to establish the course of the chain 257 to avoid interference, this sprocket being mounted on a fixed shaft secured to the frame in the same manner as the stub shaft 259.

A sprocket 261 (refer to FIGURE 21) is mounted on the shaft 262 carried on an axis fixed with respect to the frame by the structure 263 supporting the bearings 264 and 265. The sprocket 261 drives the chain 257b, which delivers power at the inner section of the double sprocket 258. A V-belt pulley 266 is arranged to transfer torque to the shaft 262 by the friction clutch assembly indicated generally at 267, and the pulley 266 receives the belt 268 driven by the motor 269 (refer to FIGURE 2). This power transmission serves to deliver power to the rollers 221, 222, and 228 from the motor 269 in a manner which is completely independent of the vertical adjustments of the machine.

*Auxiliary structure*

The preferred form of the machine is provided with a shelf structure including the end members 280 and 281 supporting the fixed panel 282 (refer to FIGURE 1). The surface of this panel forms a convenient place to store a supply of the spring coils preparatory for assembling them in the machine. The arms 283 and 284 are also recommended as supports for the lower shelf 285 which provides a surface leading into the slanted ramp plates of the lower group of clamping devices.

The controls of the machine may be devised to suit the particular requirements of the user of the machine. Preferably, an off-on switch as shown at 286 should control the motor 269, and the various air cylinders are preferably supplied with air pressure from an independent source. These air cylinders are controlled by suitable solenoid valves of standard construction (not shown), and the actuation of the solenoids may either be automatically controlled by a standard sequence timer, or the various operations may be manually energized by the workman.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A machine for assembling groups of coil springs in side-by-side relationship, comprising:
    a frame;
    a pair of beams disposed one above the other and mounted on said frame for relative movement between at least two positions of spacing between said beams;
    positioning means for moving at least one of said beams between said positions;

a plurality of clamping devices mounted on each of said beams and each adapted to receive and grip one side of the end of a coil spring;
actuating means for said clamping devices;
a normally horizontal workpiece-supporting panel movably mounted on said frame for horizontal movement;
a carrier mounted on said frame for horizontal movement above said supporting panel;
a hold-down bar assembly having a portion extending adjacent the upper of said beams, said bar assembly being mounted for limited vertical movement on said carrier;
shift actuating means for inducing related horizontal movement of said panel and said carrier;
coil-drive means mounted on each of said beams; and
control means for said actuating, positioning, and drive means.

2. A machine as defined in claim 1, wherein said beams are each secured to horizontally-extending arms pivotally mounted on said frame.

3. A machine as defined in claim 2, wherein said frame includes a vertically movable portion pivotally connected to said horizontally-extending beam arms associated with a particular one of said beams.

4. A machine as defined in claim 2, wherein said positioning means includes an actuating device connected to one of said arms and a linkage interconnecting said arms whereby movement of one of said arms induces opposite movement of the other of said arms.

5. A machine as defined in claim 1, wherein said clamping devices are laterally adjustable on said beam; and said actuating means includes a torsion bar rotatably mounted on said beam, said torsion bar having a substantially continuous flange engageable with one of said jaw members to move the same.

6. A machine as defined in claim 1, wherein said clamping devices each include jaw members opening in a vertical direction toward the opposite of said beams from the beam on which said clamping device is mounted, and also include a ramp plate extending at an incline on one side of said clamping device to a greater vertical distance from said opposite beam.

7. A machine as defined in claim 1, wherein said shift actuating means includes a link pivotally connected to said bar assembly on an axis disposed to induce vertical movement of said bar assembly as well as horizontal movement of said carrier.

8. A machine as defined in claim 1, wherein said shift-actuating means includes a shaft rotatably supported in said vertically-movable frame portion, and a gear secured to said shaft; and also includes a driving gear mounted on a portion of said frame other than said movable portion and a rack normally engaging both of said gears and laterally disengageable from at least one thereof.

9. A machine as defined in claim 1, wherein said hold-down bar assembly includes parallel arms extending from said bar to pivotal connection on a horizontal axis with said carrier.

10. A machine as defined in claim 1, wherein said coil-drive means includes vertically-spaced driven and idler sprockets mounted on said vertically-movable frame portion, a driving sprocket mounted on a portion of said frame other than said movable portion and disposed between said driven and idler sprockets, and an endless chain engaging each of said sprockets.

11. A machine for assembling groups of coil springs in side-by-side relationship, comprising:
a frame;
a pair of beams disposed one above the other and mounted on said frame;
a plurality of clamping devices mounted on each of said beams and each adapted to receive and grip one side of the end of a coil spring;
actuating means for said clamping devices;
a normally horizontal workpiece-supporting panel movably mounted on said frame for horizontal movement;
a carrier mounted on said frame for horizontal movement above said supporting panel;
a hold-down bar assembly having a portion extending adjacent the upper of said beams, said bar assembly being mounted for limited vertical movement on said carrier;
shift actuating means for inducing related horizontal movement of said panel and said carrier;
coil-drive means mounted on each of said beams; and
control means for said actuating and drive means.

12. A machine as defined in claim 11, wherein said shift-actuating means includes a shaft rotatably supported in said vertically-movable frame portion, and a gear secured to said shaft; and also includes a driving gear mounted on a portion of said frame other than said movable portion and a rack normally engaging both of said gears and laterally disengageable from at least one thereof.

13. A machine as defined in claim 11, wherein said hold-down bar assembly includes parallel arms extending from said bar to pivotal connection on a horizontal axis with said carrier.

14. A machine as defined in claim 11, wherein said shift actuating means includes a link pivotally connected to said bar assembly on an axis disposed to induce vertical movement of said bar assembly as well as horizontal movement of said carrier.

15. A machine as defined in claim 11, wherein said coil-drive means includes vertically-spaced driven and idler sprockets mounted on said vertically-movable frame portion, a driving sprocket mounted on a portion of said frame other than said movable portion and disposed between said driven and idler sprockets, and an endless chain engaging each of said sprockets.

16. A machine as defined in claim 11, wherein said clamping devices are laterally adjustable on said beam; and said actuating means includes a torsion bar rotatably mounted on said beam, said torsion bar having a substantially continuous flange engageable with one of said jaw members to move the same.

17. A machine as defined in claim 11, wherein said clamping devices each include jaw members opening in a vertical direction toward the opposite of said beams from the beam on which said clamping device is mounted, and also include a ramp plate extending at an incline on one side of said clamping device to a greater vertical distance from said opposite beam.

18. A machine for assembling groups of coil springs in side-by-side relationship, comprising:
a frame;
a pair of beams disposed one above the other and mounted on said frame for relative movement between at least two positions of spacing between said beams;
positioning means for moving at least one of said beams between said positions;
a plurality of clamping devices mounted on each of said beams and each adapted to receive and grip one side of the end of a coil spring, said clamping devices each including jaw members opening in a vertical direction toward the opposite of said beams from the beam on which said clamping device is mounted, and also including a ramp plate extending at an incline on one side of said clamping device to a greater vertical distance from said opposite beam;
actuating means for said clamping devices;
coil-drive means mounted on each of said beams; and
control means for said actuating, positioning, and drive means.

19. A machine for assembling groups of coil springs in side-by-side relationship, comprising:
a frame;

a pair of beams disposed one above the other and mounted on said frame for relative movement between at least two positions of spacing between said beams;

positioning means for moving at least one of said beams between said positions;

a plurality of clamping devices mounted on each of said beams and each adapted to receive and grip one side of the end of a coil spring, said clamping devices each including jaw members opening in a vertical direction toward the opposite of said beams from the beam on which said clamping device is mounted, and also including a ramp plate extending at an incline on one side of said clamping device to a greater vertical distance from said opposite beam, said clamping devices being laterally adjustable on said beam;

actuating means for said clamping devices, said actuating means including a torsion bar rotatably mounted on said beam, said torsion bar having a substantially continuous flange engageable with one of said jaw members to move the same;

coil-drive means mounted on each of said beams; and control means for said actuating, positioning, and drive means.

References Cited
UNITED STATES PATENTS

| | | | |
|---|---|---|---|
| 1,930,715 | 10/1933 | Heur | 140—92.93 XR |
| 2,275,209 | 3/1942 | Turgeon | 140—92.93 XR |
| 2,663,038 | 12/1953 | Gail | 140—92.8 |
| 2,694,418 | 11/1954 | Bergstrom | 140—92.7 |
| 2,925,099 | 2/1960 | Bergstrom | 140—92.7 |

WILLIAM J. STEPHENSON, *Primary Examiner.*